Figure 1:
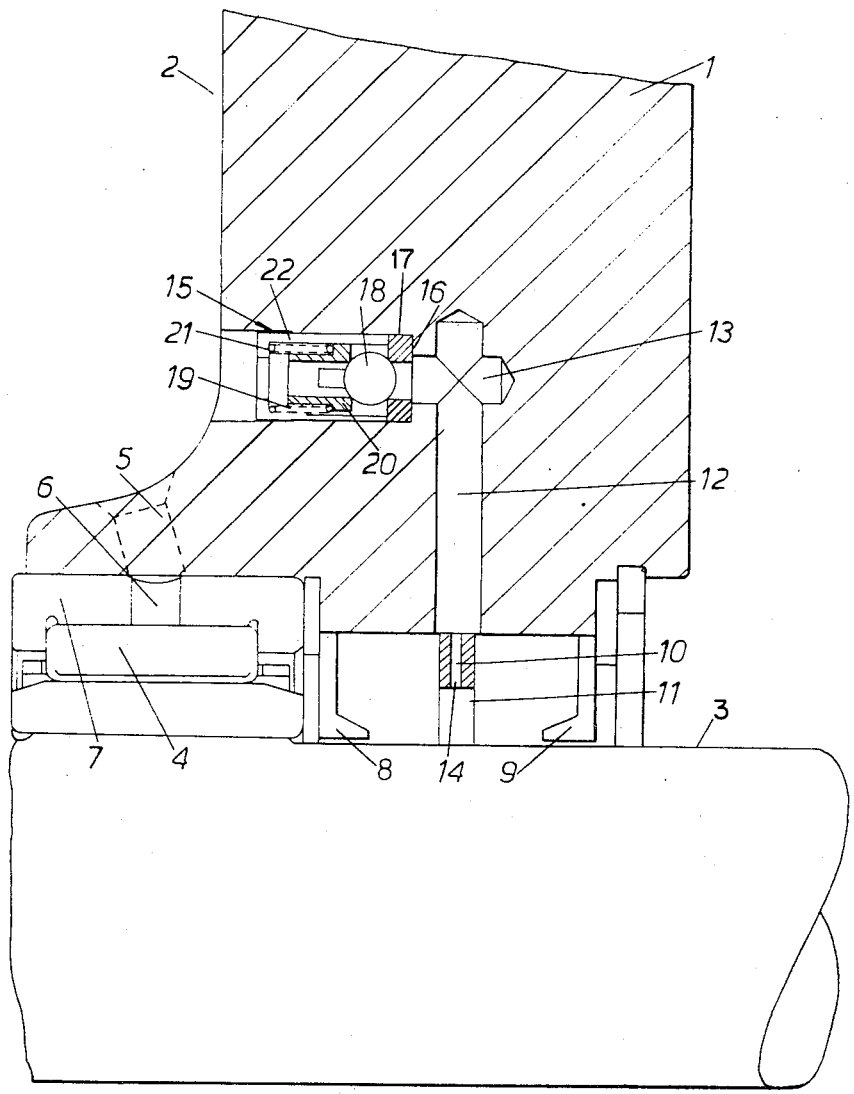

United States Patent
Franke et al.

[15] 3,684,335
[45] Aug. 15, 1972

[54] LUBRICATOR, PARTICULARLY FOR HYDRODYNAMIC BRAKES EVACUATED DURING IDLING

[72] Inventors: Kurt Franke, Bergen-Enkheim; Hermann Steffen, Neu-Isenburg, both of Germany

[73] Assignee: ITT Industries, Inc., New York, N.Y.

[22] Filed: July 29, 1970

[21] Appl. No.: 59,323

[30] Foreign Application Priority Data

July 30, 1969   Germany..........P 19 38 598.9

[52] U.S. Cl.................308/187, 188/264 B, 308/107
[51] Int. Cl................................................F16d 65/78
[58] Field of Search.......308/187, 187.1, 78, 90, 109, 308/112; 188/264 B, 264 R

[56] References Cited
UNITED STATES PATENTS

| | | |
|---|---|---|
| 2,712,478 | 7/1955 | Carroll ...................308/107 |
| 2,723,168 | 11/1955 | Carroll ...................308/109 |
| 3,247,935 | 4/1966 | Marland.................188/264 B |
| 3,320,007 | 5/1967 | Tennies et al..........308/187 X |
| 3,552,875 | 1/1971 | Bond, Jr. ..............308/187 X |

*Primary Examiner*—Martin P. Schwadron
*Assistant Examiner*—Barry Grossman
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

In this lubrication system for rotating shafts, a chamber outboard of the bearing is formed between opposed one-way sealing rings, the chamber being connected to the machine chamber through a ball valve to limit the pressure in the chamber.

2 Claims, 2 Drawing Figures

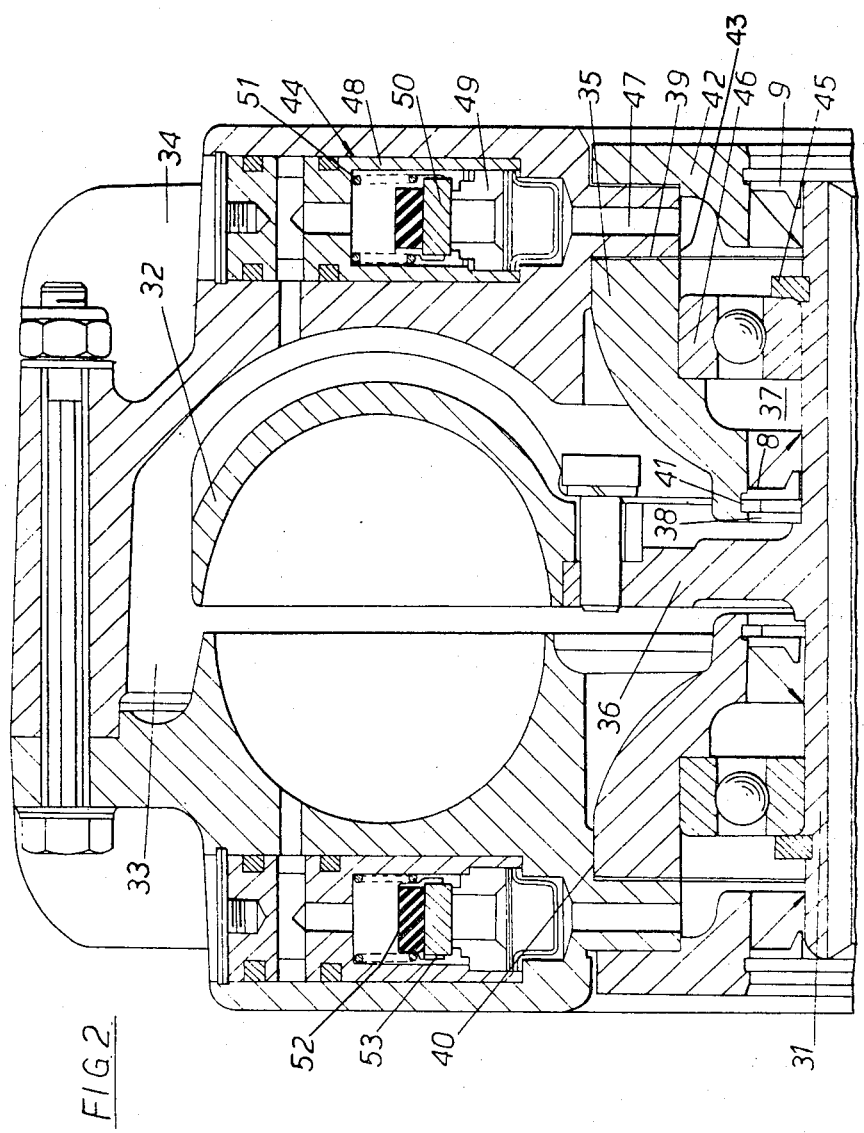

LUBRICATOR, PARTICULARLY FOR HYDRODYNAMIC BRAKES EVACUATED DURING IDLING

The invention relates to a lubricator for seals and bearings at the wall entrances for a rotating and/or an axially displaceable shaft or rod projecting into a closed chamber in which alternatively high, low or normal pressure is produced. During low or normal pressure this chamber is at least partly filled with a lubricant as, e.g., in a hydrodynamic brake evacuated during idling.

The idea to provide the hydrodynamic brakes with a device which during idling produces a vacuum or low pressure in the brake chamber where the rotor rotates was particularly advantageous for the operation of a hydrodynamic brake. The power loss during idling can thus be reduced to a fraction of the normal value because an air circulation between rotor and stator does not take place. The reaction time of the brake is also reduced since upon actuation the pressure medium flows quicker from the charging cylinder to the brake chamber and the air enclosed in the brake does not have to be compressed. Further it was possible to increase the brake power because due to the low pressure more space was available for the fluid which is fed into the chamber. In conventional hydrodynamic brakes the air enclosed in the brake could be compressed, for instance, to a maximum of 1/6 of its volume when the brake was actuated with 6 atm (atmospheres) excess pressure so that the quantity of fluid which could be fed in was by the corresponding amount lower than the housing volume.

With the advantages arose the problem of lubricating the bearings and the seals. The rest of the oil which in conventional hydrodynamic brakes remains in the inner chamber after evacuation is not sufficient for an automatic lubrication of the bearings. Therefore additional lubricating means would be necessary to lubricate the ball bearings and the sealing element to prevent them from destruction after a short time of operation. A lubricating oil pump for the supplying the bearings with lubricant is too expensive and the lubricant which is conveyed under pressure would leak at the shaft through the seals.

An object of the invention is to provide an arrangement which ensures a sufficient lubrication of the bearings and the sealing elements at the wall entrance for the shaft or the movable rod projecting into a chamber which is temporarily evacuated. Such an arrangement has to be reliable, inexpensive and should not be spacy.

According to the invention this is achieved by arranging two unidirectional sealing rings at each wall entrance between the rotating and the non-rotating part or member of the device in such a way that the lips of the sealing rings face each other and a hollow space is left between both sealing rings in which an oil cushion is formed for lubrication.

In order to avoid an excess pressure in the hollow space receiving the oil cushion, the hollow space between the sealing rings communicates with the interior of the housing by one or several bores and in this connection a pressure limiting valve is arranged which opens from the hollow space to the interior of the housing.

In an improved embodiment of the invention in the enlarged hollow space between the sealing rings the roller bearing is placed so that it runs constantly in an oil bath.

The arrangement according to the invention can be applied to various devices. It will be described more precisely with reference to the accompanying drawings, in which FIG. 1 shows the arrangement according to the invention at the wall entrance of a shaft into an evacuated chamber; and FIG. 2 shows a special embodiment of the invention in a hydrodynamic brake evacuated during idling.

FIG. 1 shows only a part of the housing 1 which encloses the chamber 2. During operation of the system said chamber which is a part of the system can be either pressurized or evacuated. A shaft 3 is passed through the chamber wall 1. Between the housing wall 1 and the shaft 3 a roller bearing 4 is arranged which makes the rotation of the shaft 3 possible. The supply of the bearings with lubricant is ensured by a bore 5 in the housing wall 1. Said bore communicates, on the one hand, with the chamber 2 and, on the other hand, with a bore 6 in the radially outer ring 7 of the bearing 4. Since chamber 2 is temporarily at least partly filled with lubricant, i.e. with hydraulic fluid, the quantity of lubricant necessary for the lubrication of the bearings is taken from chamber 2.

Two unidirectional sealing rings 8, 9 are arranged between the housing wall 1 and the shaft 3 beside the roller bearing 4 in axially outward direction. The lips of the sealing rings 8, 9 are inclined towards each other so that the sealing ring 8 does not let the lubricant or the hydraulic fluid or air into the evacuated chamber 2 while the sealing ring 9 prevents the hydraulic fluid from leaking out. Between the unidirectional sealing rings 8, 9 a spacing ring 10 is arranged so that a small hollow space 11 is formed. This hollow space is connected to the chamber 2 by a bore 14 in the spacing ring 10 and by bores in the housing wall. In the example embodiment of FIG. 1 this connection is established by two blind bores 12 and 13 in the housing 1 which are perpendicular to one another and interconnected with each other. The bore 12 opens via the bore 14 in the spacing ring 10 into the hollow space 11 between the sealing rings 8 and 9.

In the larger portion of the bore 13 which opens into chamber 2 a pressure limiting valve 15 is arranged. On the shoulder 16 formed by the larger portion of the bore 13 a sealing ring 17 is arranged on the side facing the chamber 2. The passage of the valve is closed by a ball 18 which is kept in initial position by the force of a spring 19. The spring 19 is supported by a sleeve 20. One end of sleeve 20 is stepped on the outer circumference and rests with the inner circumference on the valve closing member 18. The other end of sleeve 20 rests against the beaded edge 21 of a bushing 22 which is pressed into the larger portion of the bore 13.

When pressure medium is conveyed into chamber 2 it penetrates through the lubrication bores 5, 6 into the roller bearing 4 and through the lip of the unidirectional sealing ring 8 into the hollow space 11. In this direction the sealing ring 8 seals not against pressure but against vacuum as mentioned above. The pressure medium is prevented from flowing from the hollow space 11 outwardly by the second unidirectional sealing ring 9 whose lip comes to lie with high pressure against the shaft 3. In this way between the sealing rings 8 and 9 a cushion of lubricant is formed which remains in its place even when the chamber 2 is evacuated because then the pressure difference between the hollow space 11 and the chamber 2 presses the lip of the sealing ring 8 against the shaft 3.

In order to avoid the pressing of the sealing lips against the shaft 3 with the full power of 6 – 7.5 atm excess pressure which have been fed from chamber 2 having a reduced pressure (the consequence would be a strong heating, high wear and an eventual destruction of the sealing rings 8, 9), a connection 12, 13 with a pressure limiting valve 15 is provided from the hollow space 11 between the sealing rings 8, 9 to the chamber 2 of the housing. When chamber 2 has been pressurized the pressure limiting valve 15 is closed. On the other hand, the spring 19 is dimensioned such that upon evacuation of the chamber 2 the pressure built up in the hollow space 11 and the bore 12 lifts the valve closing member 18 from its seat. The pressure medium then can flow into chamber 2 until only a predetermined pressure of, e.g., 0.8 or 1.0 atm excess pressure remains in the hollow space 11. In this way is ensured that the oil cushion between the two sealing rings 8 and 9 is preserved and does not press the lips of the sealings too much against the shaft 3 but safeguards an absolute seal and a sufficient lubrication.

FIG. 2 shows a further embodiment of the invention as employed in a hydrodynamic brake evacuated during idling.

The rotor of the hydrodynamic brake consists of the hub 31 and the rotor vanes 32 connected to the hub. As known — the rotor which is connected with the Cardan shaft via a shaft guided in the rotor hub 31 rotates in the interior 33 of the housing or the stator 34. In order to brake the wheels of the respective axle, pressure medium is fed into the chamber 33 between the rotor and the stator 34. This chamber is evacuated when the brakes are not applied.

The stator 34 and the rotor 31 are connected by two ring bearings 35 arranged on both sides of the rotor flange 36. In FIG. 2 the ring bearings have a conical surface and a bore 37 which is stepped twice. The part of the ring bearings 35 with the radially smaller bore faces the rotor flange 36 and rests on a collar 38 of the rotor flange. The ring bearing 35 is kept in a recess of the stator 34 by its outer lateral surfaces 39 and a flattening 40 at the widest point of the conical surface. One of the unidirectional sealing rings 8 is arranged between the ring bearing 35 and the rotor hub 31 in that part of the bore 37 which has the smallest diameter. On the side of the sealing ring 8 facing the rotor flange 36 a fastening ring 41 is arranged in a groove in the bore 37. The second unidirectional sealing ring 9 is placed between the annular lateral disc 42, which lies in a lateral recess of the stator 34, and the rotor hub 31. Due to this arrangement a stepped hollow space is formed by the bore 37 and is limited by the sealing rings 8 and 9, the rotor hub 31, the lateral disc 42, the surface 43 of the stator which is flush with the radially largest portion of the bore 37, and the ring bearing 35. In this space the roller bearing 46 is placed which is supported by the step in the ring bearing 35 and the stop ring 45 arranged in a groove of the rotor hub 31. In the example of FIG. 2 the ring 8 seals against pressure from outside and the ring 9 seals against pressure directed outwardly. When pressure medium is supplied to the hydrodynamic brake it enters through the radially narrow portion of the bore 37 and the sealing ring 8 into the hollow space between the rings 8 and 9 thus lubricating these sealing rings and the roller bearing 46 arranged between them. The sealing 9 prevents the lubricant from leaking.

When the chamber 33 is evacuated the pressure in the hollow space between the sealing rings 8 and 9 has to be lowered to the maximally permissible pressure. For this purpose a connection 47 is provided to the chamber 33 through the stator housing 34. In a wider portion of this connection a pressure limiting valve 44 is arranged according to the embodiment of FIG. 1. In the wider portion of the bore 47 a valve housing 48 is arranged in a sealed manner and receives a hollow body 49 which is screwed in. On the reduced front face of the body 49 a valve closing member 50 is kept in engagement by the force of a spring 51. When the pressure in the space between the sealing rings 8, 9 can lift the cylindric valve closing member 50 which is covered with a sealing rubber plate 52, against the force of the spring 51 from its seat, pressure medium is displaced through the lateral slots 53 in the valve closing member 50 into the chamber 33. The essential advantage of this invention consists in that the sealing rings and the roller bearing is sufficiently supplied with lubricant during evacuation without an additional device such as an oil pump. In this way the wear of these parts is considerably reduced. Further the whole system is cheaper without an additional device.

What is claimed is:

1. A lubricator for the seals and bearings between a non-rotating member and a rotating member of a hydrodynamic brake comprising:

said hydrodynamic brake having said rotating member disposed within and encircled by said non-rotating member;

a first closed chamber disposed solely within said non-rotating member, said first chamber being full of a lubricant and subjected to pressure during a first given period of operation and being only partially full of said lubricant and subjected to a reduced pressure during a second given period of operation different than said first period of operation;

two unidirectional sealing rings disposed between said non-rotating member and said rotating member, each of said sealing rings having a sealing lip extending from one side thereof bearing against said rotating member, said sealing rings being disposed to have said lips face each other, said sealing rings being disposed in spaced relation with respect to each other to provide a second closed chamber between said sealing rings, said non-rotating member and said rotating member, said sealing rings being subjected to the same pressure as that present in said second chamber;

a bearing disposed between said rotating and non-rotating member within said second chamber;

at least a first passage disposed partially in said non-rotating member in communication with said first chamber and partially between said rotating and non-rotating members outside said second chamber, said first passage delivering said lubricant under pressure to said second chamber from said first chamber through one of said sealing rings from a side thereof remote from said sealing lip into said second chamber during said first and second periods, said sealing lip of said one of said sealing rings and said sealing lip of the other of said sealing rings preventing said lubricant from leaking out of said second chamber during either of said first and second periods;

at least a second passage disposed solely within said non-rotating member between said first and second chambers in a spaced relation with respect to said bearing; and a first pressure relief valve disposed in said second passage responsive to the pressure difference within said first and second chambers during said second period to reduce the pressure in said second chamber to prevent said sealing lips of each of said sealing rings from being pressed against said rotating member by the pressure within said second chamber to reduce the heating and wear of said sealing lips.

2. A lubricator according to claim 1, further including a third passage disposed solely within said non-rotating member between said first and second chambers in a spaced relation with respect to said bearing; and a second pressure relief valve disposed in said third passage responsive to the pressure difference within said first and second chambers during said second period to cooperate with said first relief valve to reduce the pressure in said second chamber to prevent said sealing lips of each of said sealing rings from being pressed against said rotating member by the pressure within said second chamber to reduce the heating and wear of said sealing lips.

* * * * *